United States Patent [19]

Matsuo et al.

[11] Patent Number: 5,153,741
[45] Date of Patent: Oct. 6, 1992

[54] CROSSTALK CANCELLING CIRCUIT FOR PLAYBACK CHROMINANCE SIGNAL OF VTR

[75] Inventors: Yasutoshi Matsuo, Kawasaki; Ryo Nakano, Yokohama, both of Japan

[73] Assignee: Victor Company of Japan, Ltd., Japan

[21] Appl. No.: 389,396

[22] Filed: Aug. 4, 1989

[30] Foreign Application Priority Data

Aug. 5, 1988 [JP] Japan .................................. 63-195785

[51] Int. Cl.$^5$ .............................................. H04N 7/97
[52] U.S. Cl. ..................................... 358/328; 358/310
[58] Field of Search ................. 358/328, 329, 310, 31, 358/36, 37, 340, 40, 166, 167

[56] References Cited

U.S. PATENT DOCUMENTS

| | | | |
|---|---|---|---|
| 4,178,606 | 12/1979 | Hirota | 358/328 |
| 4,930,005 | 5/1990 | Yamada et al. | 358/329 |
| 4,969,033 | 11/1990 | Yamada et al. | 358/328 |

Primary Examiner—Dale M. Shaw
Assistant Examiner—Thai Tran
Attorney, Agent, or Firm—Lowe, Price, LeBlanc & Becker

[57] ABSTRACT

A crosstalk cancelling circuit for a VTR eliminates adjacent-track crosstalk in a playback down-converted chrominance signal, with the resultant signal and a playback luminance signal being supplied to respective output terminals for re-recording by another VTR. Substantially improved display image quality is obtained from the re-recorded video signals, by comparison with prior art methods.

7 Claims, 7 Drawing Sheets

CROSSTALK CANCELLING CIRCUIT FOR PLAYBACK CHROMINANCE SIGNAL OF VTR

BACKGROUND OF THE INVENTION

1. Field of Applicable Technology

The present invention relates to a circuit for cancelling adjacent-track crosstalk that is contained in a playback chrominance signal produced by a video tape recorder (hereinafter referred to as VTR). More specifically, the invention relates to a circuit for cancelling crosstalk in a playback down-converted chrominance signal which is to be supplied directly to another VTR to execute re-recording of a video signal.

2. Prior Art Technology

In a color composite video signal, luminance information is conveyed by a luminance signal of varying amplitude which is generally referred to as the Y signal, and color information is conveyed by a signal (the C signal) which is variously referred to as the chroma signal, the chrominance signal, or the carrier chrominance signal. To avoid confusion in the following, that signal will be referred to as the carrier chrominance signal throughout. The carrier chrominance signal is derived by simultaneous phase and amplitude modulation of a carrier whose frequency (e.g. 3.58 MHz) is usually selected to be higher than the maximum utilized frequency in the luminance signal frequency band. In general, with a domestic-use color VTR, a method of recording is utilized whereby the luminance signal and carrier chrominance signal components of a composite video signal are separated from the composite video signal, the luminance signal is used to frequency modulate a high frequency carrier to obtain a wide-band FM luminance signal, and frequency down-conversion of the carrier chrominance signal is executed to obtain a down-converted chrominance signal which occupies a frequency band that is lower than that of the FM luminance signal. The FM luminance signal and down-converted chrominance signal are then combined to obtain a recording signal, which is recorded on magnetic tape. In order to maximize the tape utilization efficiency with such a domestic-use VTR and thereby increase the maximum possible recording time, a "guard band-less" method of recording is usually employed, whereby no guard bands are provided between mutually adjacent recording tracks on the magnetic tape. As a result, crosstalk is induced into the contents of each track, from the two mutually adjacent tracks which are positioned on each side of the track, which results in inteference being produced on a display image when playback of the tape is executed. To alleviate this problem, at least two magnetic heads are used during both recording and playback for respectively recording and reproducing alternate tracks, with the respective azimuth angles of the head gaps of these magnetic heads being mutually different by a specific amount (e.g. ±6°). This method of crosstalk reduction is very effective for the FM luminance signal, and in particular for the high frequency components of that FM luminance signal. However it is much less effective for the down-converted chrominance signal. Thus, the down-converted chrominance signal that is obtained by playback of a magnetic tape using such a VTR will contain substantial levels of crosstalk.

To overcome this problem, a method has been proposed in the prior art which is known as the PS (Phase Shift) method, whereby the phase of the carrier chrominance signal (and hence the down-converted chrominance signal) is shifted by 90° at the start of each horizontal scanning interval prior to recording, and whereby this successive 90° phase shifting applied to successive horizontal scanning intervals (i.e. successive 1 H intervals, where H denotes a horizontal scanning interval) is executed in a fixed direction during recording of one track on the magnetic tape and in the opposite direction during recording of the succeeding track, then in the first direction, and so on, i.e. with the direction of phase shift alternating for successive tracks on the tape.

Figure 1A:
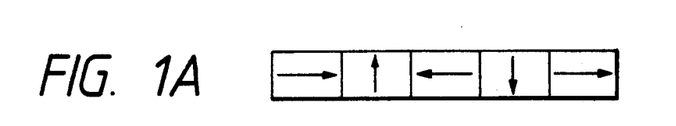
FIGS. 1A to 1E are conceptual diagrams for illustrating a prior art phase shift method of cancellation of crosstalk components of a playback carrier chrominance signal.
Figure 1B:
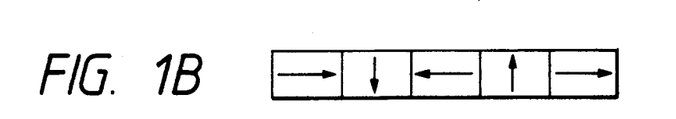
Figure 1C:
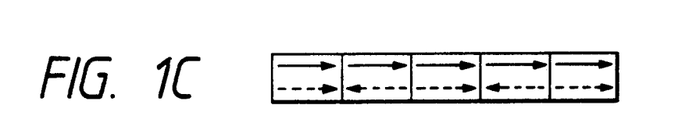
Figure 1D:
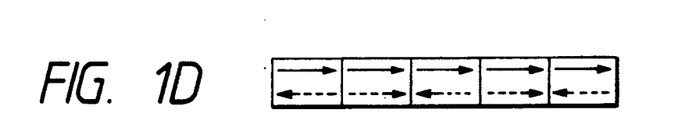
Figure 1E:
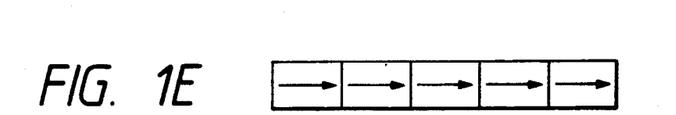

FIGS. 1A to 1E are conceptual diagrams for illustrating this PS method. In the following description and also in subsequent descriptions of embodiments of the present invention it will be assumed that a VTR having two magnetic heads is utilized. However the invention is equally applicable to a VTR having a greater number of magnetic heads. In FIGS. 1A to 1E, the directions of the arrows shown in full-line form indicate the phase of the down-converted chrominance signal that is recorded on the magnetic tape, while the directions of the arrows shown in broken-line form indicate the phase of crosstalk that is induced during each 1 H interval, from adjacent tracks. FIG. 1A shows the 90° phase shifts which occur in successive 1 H intervals for the down-converted chrominance signal of the recording signal that is applied to one of the magnetic heads of the VTR during recording of one track on the magnetic tape. Similarly, FIG. 1B shows the 90° phase shifts which occur in successive 1 H intervals for the down-converted chrominance signal of the recording signal that is applied to the other one of the magnetic heads of the VTR during recording of the succeeding track on the magnetic tape. FIG. 1C shows the phase relationships in a chrominance signal (e.g. a playback carrier chrominance signal obtained by frequency conversion of a playback down-converted chrominance signal) that is subsequently obtained from the track recorded by the signal of FIG. 1A, after the playback signal has been processed to restore the phase of the signal during each 1 H interval to the original condition, i.e. to the condition prior to executing the aforementioned 90° phase shift processing at the time of recording. FIG. 1D shows the carrier chrominance signal that results from delaying the signal of FIG. 1C by 1 H (i.e. one horizontal scanning interval). As can be understood from FIGS. 1C and 1D, the phase of the desired carrier chrominance signal is identical for both of the signals shown, during each horizontal scanning interval, while the phase of the respective crosstalk components contained in the signals shows a difference of 180° during each horizontal scanning interval. If it is assumed that there will usually be a strong degree of vertical correlation in the chrominance information in successive 1 H intervals (i.e. in successive horizontal scan lines represented during these horizontal scanning intervals), then it is possible to mutually add the signals of FIGS. 1C and 1D, to obtain the signal shown in FIG. 1E. In this signal, the crosstalk components of the playback chrominance signal have been mutually cancelled.

As described above, a color composite video signal is recorded by converting the luminance and chrominance components of that signal into an FM luminance signal and a down-converted chrominance signal. At the time of playback, the FM luminance signal is demodulated to recover the original luminance signal, while the down-converted chrominance signal is subjected to frequency up-conversion to recover the original carrier chrominance signal. If the PS method of crosstalk cancellation described above is being utilized, then the carrier chrominance signal which has thus been obtained is processed as described referring to FIGS. 1A to 1E, and the resultant carrier chrominance signal with crosstalk excluded is combined with the recovered luminance signal, to obtain the original color composite video signal (with treatment of the synchronizing components having being omitted from this description, for simplicity).

In the prior art, re-recording (sometimes referred to as video dubbing) of a composite video signal that has thus been recovered by playback of a magnetic tape is generally executed by supplying the recovered composite video signal to another VTR, to be recorded thereby. However the playback down-converted chrominance signal obtained from the magnetic tape is first passed through a band pass filter, then is frequency up-converted by a frequency converter circuit to recover the carrier chrominance signal. The frequency conversion operation is controlled by APC (Automatic Phase Control) and AFC (Automatic Frequency Control) systems. Due to transfer through the band pass filter, the phase/frequency characteristic of the playback chrominance signal is adversely affected, and the chrominance signal is also adversely affected by the action of the AFC and APC systems, which introduce increased levels of phase modulation noise. Thus, when this carrier chrominance signal is then again down-converted and re-recorded (in combination with the FM luminance signal) in another VTR, and the resultant recorded tape is subsequently played back, there will be a significant deterioration in the quality of the video image that is obtained, by comparison with that provided by the playback video signal which was used for this re-recording. If a tape which has thus been re-recorded is then re-recorded onto another tape, this deterioration of image quality will further increase. This places a sharp limitation upon the number of times that such re-recording can be successively executed.

There are some types of tape re-recording apparatus in which the playback down-converted chrominance signal obtained from one magnetic tape is directly recorded onto another tape, without first executing frequency up-conversion then subsequent down-conversion of that down-converted chrominance signal. However with such a prior art apparatus, crosstalk cancellation is not executed for the playback down-converted chrominance signal prior to re-recording. Thus, when playback is executed of a tape that has been re-recorded in this way, there will be a substantial level of crosstalk noise contained in the playback down-converted chrominance signal. This has a very adverse effect upon subsequent processing that is applied to recover the carrier chrominance signal from that down-converted chrominance signal, causing a severe deterioration of image quality.

SUMMARY OF THE INVENTION

It is an objective of the present invention to overcome the problems described above, by providing a crosstalk cancelling circuit for cancelling the crosstalk components present in a playback down-converted chrominance signal obtained from VTR, to provide a noise-free down-converted chrominance signal which can then be re-recorded by another VTR. This enables the adverse effects of such re-recording upon image quality to be significantly reduced.

More specifically, the present invention provides a crosstalk cancelling circuit which is applicable to a VTR having a playback system for playback of a down-converted chrominance signal and a frequency modulation luminance signal from recording tracks of a magnetic tape, the down-converted chrominance signal having been phase shifted prior to recording by successive 90° phase shifts in consecutive horizontal scanning intervals in a predetermined direction of phase shifting, the playback system including means for demodulating the frequency modulation luminance signal to obtain a luminance signal, the luminance signal and down-converted chrominance signal being supplied to first and second output terminals of the VTR respectively. A crosstalk cancelling circuit according to the present invention is inserted to execute mutual cancellation of crosstalk components contained in the down-converted chrominance signal and for supplying a resultant down-converted chrominance signal, which is free from crosstalk components, to the second output terminal.

According to one embodiment, such a crosstalk cancelling circuit comprises phase shift circuit means for phase shifting the down-converted chrominance signal by 90° in a predetermined direction, delay means for delaying the output signal from the phase shift circuit means by one horizontal scanning interval, and operational circuit means for combining the output signal from the delay means means with the down-converted chrominance signal, to obtain an output down-converted chrominance signal having crosstalk components mutually cancelled, and for supplying the output down-converted chrominance signal to the second output terminal.

DESCRIPTION OF PREFERRED EMBODIMENTS

Figure 2A:
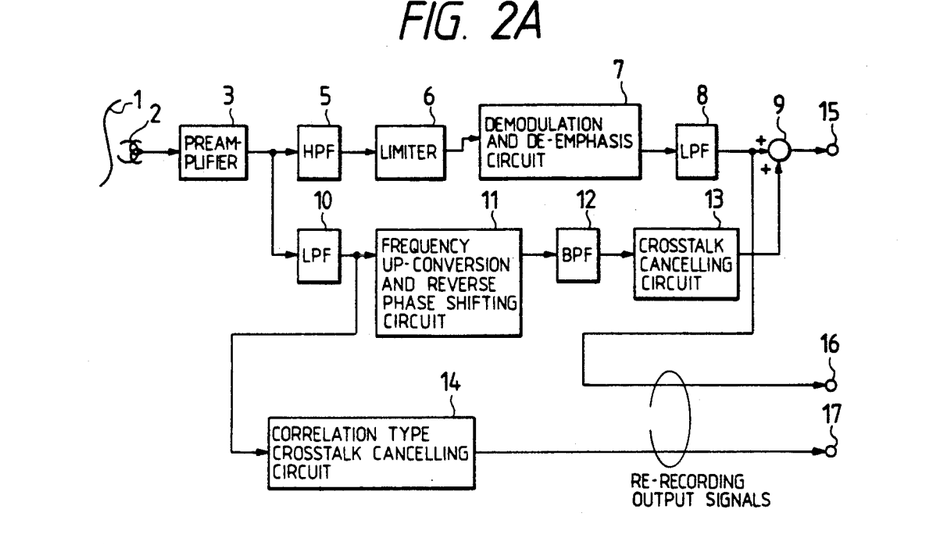
FIGS. 2A, 2B are system block diagrams of a playback system and recording system respectively of a VTR incorporating a first embodiment of a crosstalk cancelling circuit according to the present invention.
Figure 2B:
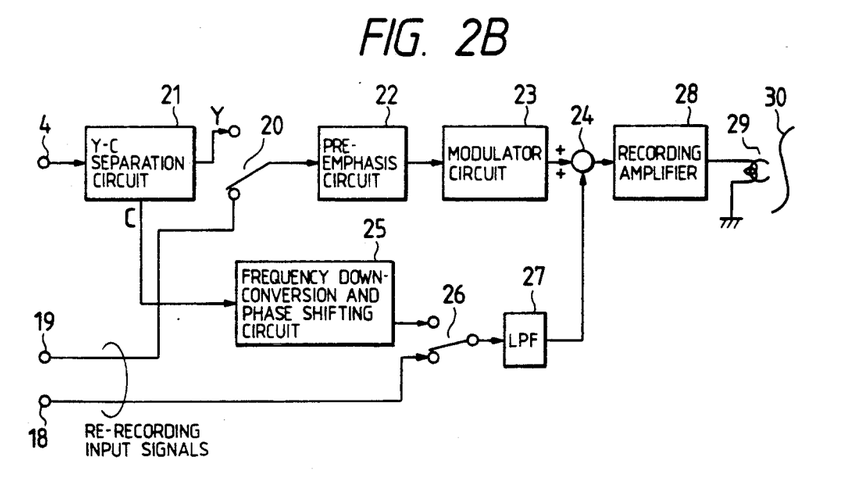

FIGS. 2A and 2B are system block diagrams of a playback system and a recording system respectively of a VTR employing the PS method of crosstalk cancellation during normal recording operation, which incorporates a first embodiment of a crosstalk cancelling circuit according to the present invention. In FIG. 2A, a playback signal derived by a magnetic head 2 from a magnetic tape 1 is amplified in a preamplifier 3 and is separated into a playback FM luminance signal and a playback down-converted chrominance signal. The FM luminance signal is transferred through a HPF (high pass filter) 5, a limiter circuit 6 and a demodulation and de-emphasis circuit 7, to be demodulated and have a specific de-emphasis characteristic applied, and the resultant signal is then transferred through a LPF (low pass filter) 8 to obtain a playback luminance signal, which is applied to one input of a signal adder 9. The down-converted chrominance signal is transferred through a LPF 10, then (in the case of normal playback operation) through a frequency up-conversion and reverse phase shifting circuit 11 and a BPF (band pass filter) 12 to recover the carrier chrominance signal. This is then transferred through a crosstalk cancelling circuit 13, and the resultant carrier chrominance signal is then combined with the luminance signal in the adder 9, to obtain a playback composite video signal which is supplied to an output terminal 15.

All of the circuit blocks described above are utilized in a prior art domestic-use VTR. A reverse phase shift circuit within the circuit block 11 serves to convert the phase relationships of the carrier chrominance signal and crosstalk components in that carrier chrominance signal to the form shown in FIGS. 1C and 1D described above. The crosstalk cancelling circuit 13 executes cancellation of the crosstalk components contained in the carrier chrominance signal as described hereinabove referring to FIGS. 1A to 1E, by combining successive pairs of horizontal scanning lines of the carrier chrominance signal. However this VTR is also capable of providing playback signal outputs, for use in re-recording the contents of the magnetic tape 1 onto another magnetic tape by using an external VTR (or a VTR which is combined with that of FIGS. 2A, 2B to form a single apparatus).

Specifically, the recovered luminance signal from the LPF 8 is supplied to an output terminal 16, while the playback down-converted chrominance signal from the output of the LPF 10 is transferred through an embodiment of a crosstalk cancelling circuit according to the present invention, denoted by numeral 14, to an output terminal 17. The output terminals 16 and 17 can thus be connected to another VTR which has is adapted for receiving mutually separate down-converted chrominance signal and luminance signal inputs as re-recording input signals, for thereby re-recording the contents of the magnetic tape 1. As shown in the recording system of FIG. 2B, the VTR is equipped with input terminals 18 and 19 for respectively receiving such down-converted chrominance signal and luminance signal inputs. The recording system can be switched between a normal recording mode of operation, in which a color composite video signal applied to an input terminal 4 is converted to a FM luminance signal and down-converted chrominance signal for recording, as described hereinabove, and a re-recording mode of operation in which a playback down-converted chrominance signal and luminance signal supplied to the input terminals 18 and 19 are recorded. Selection between the normal and the re-recording modes is executed by means of a pair of linked switches 20 and 26.

During normal recording operation, a color composite video signal applied to the input terminal 4 is separated into a Y (luminance) signal and C (carrier chrominance) signal by a Y-C separator circuit 21. The Y signal is transferred through a pre-emphasis circuit 22 and an FM modulator circuit 23 to thereby obtain an FM luminance signal, which is supplied to one input of a signal adder 24. The carrier chrominance signal is transferred through a frequency down-conversion and phase shifting circuit 25 to obtain a down-converted chrominance signal having the successive 90° phase shifts in consecutive horizontal scanning intervals as described hereinabove. During normal recording operation, the resultant down-converted chrominance signal is then transferred through a LPF 27 to be combined with the FM luminance signal in the adder 24, to obtain a recording signal which is amplified in a recording amplifier 28 and supplied to a magnetic head 29 to be recorded on a magnetic tape 30. A specific set of horizontal scanning lines of this recording signal are recorded on one track of the tape 30 during one scan across the tape by the magnetic head 29, e.g. with all of the horizontal scanning lines of one field of the video signal being thus recorded on one track. A succeeding set of horizontal scanning lines of the recording signal are then recorded on an adjacent track, (by the operation of a head switching system and a second magnetic head, not shown in FIG. 2B).

Figure 3:
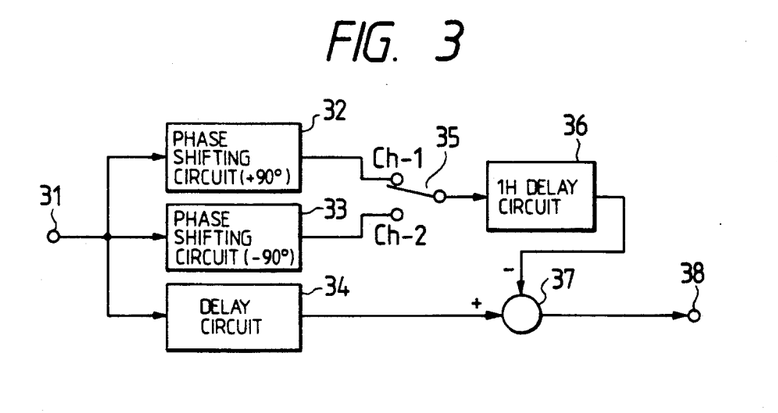
FIG. 3 is a basic system block diagram of the first embodiment of a crosstalk cancelling circuit according to the present invention.

FIG. 3 is a block diagram for illustrating the basic configuration of the first embodiment of a crosstalk cancelling circuit shown in FIG. 2A. The playback down-converted chrominance signal produced from the LPF 10 in FIG. 2A (i.e. after separation of the luminance and chrominance components of the playback signal) is supplied to an input terminal 31. A switch 35 is controlled (by a circuit, not shown in the drawings, which receives head switching pulses produced in response to rotation of the head cylinder of the VTR) to execute switching changeover twice in each rotation of the head cylinder, i.e. each time a "channel 1" playback down-converted chrominance signal (abbreviated in the following to Ch-1 signal) produced by scanning across one track by one of the magnetic heads is selected, or a "channel 2" down-converted chrominance signal (hereinafter Ch-2 signal) produced by scanning across an adjacent track by the other one of the magnetic heads is selected. The corresponding contacts of the switch 35 are indicated as the Ch-1 and Ch-2 contacts in FIG. 3.

A phase shifting circuit 32 executes a +90° phase shift of the Ch-1 signal, while a phase shifting circuit 33 executes a −90° phase shift of the Ch-2 signal. The phase shifted Ch-1 or Ch-2 signal that is selected by the switch 3 is then delayed by one horizontal scanning interval in a 1 H delay circuit 36, and the resultant signal is applied to one input of a signal subtractor 37.

Each of the preferred embodiments of the present invention utilizes a Hilbert transform type of phase shift circuit (described hereinafter) for executing 90° phase shift operation. Such a phase shift circuit produces a fixed delay between its input and output terminals, in addition to a 90° phase shift, and an equivalent amount of delay is therefore indicated in FIG. 3 as being applied by a delay circuit 34 which supplies the playback down-converted chrominance signal to the other input of the subtractor 37, to compensate for the delay applied by the phase shift circuit 32 or 33. The signal obtained by mutually subtracting the output signals from the delay circuit 34 and the 1 H delay circuit 36 is supplied to an output terminal 38, to be transferred to the output terminal 17 of FIG. 2A.

Figure 4A:
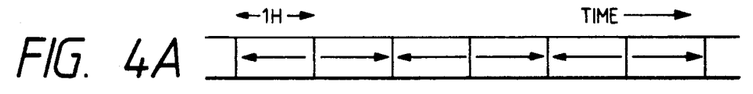
FIGS. 4A to 4I are conceptual diagrams for illustrating phase relationships during operation of the embodiment of FIG. 3.
Figure 4B:
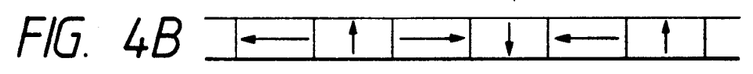
Figure 4C:
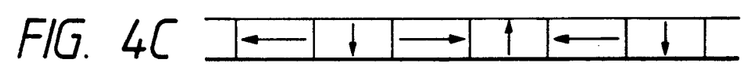
Figure 4D:
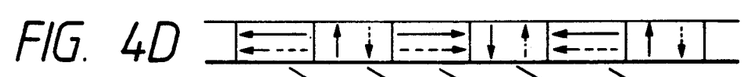
Figure 4E:
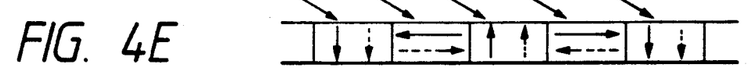
Figure 4F:
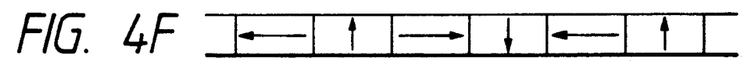

The basic operation of this circuit will be described referring to the conceptual phase diagrams of FIGS. 4A to 4I. FIG. 4A illustrates the phase relationships in successive 1 H intervals (i.e. successive horizontal scanning lines) of the chrominance signal in an NTSC standard composite video signal. As shown, the phase is inverted once in each 1 H interval in NTSC standard. FIGS. 4B and 4C show the corresponding phase conditions for Ch-1 and Ch-2 recording chrominance signals which are recorded on mutually adjacent tracks of a magnetic tape, i.e. signals produced from the frequency down-conversion and phase shifting circuit 25 of FIG. 2B. As shown, the phase of the Ch-1 recording signal is shifted by −90° for each 1 H interval, while the phase of the Ch-2 recording signal is shifted by +90° for each 1 H interval. FIG. 4D shows the resultant Ch-1 playback down-converted chrominance signal corresponding to FIG. 4B. The broken-line arrows indicate the phase of crosstalk that has been induced from adjacent Ch-2 tracks. The phase shifting circuit 32 shifts the phase of this Ch-1 signal by 90°, and a 1-H delay is applied to the resultant signal by the 1 H delay circuit 36, so that the resultant output signal from the 1 H delay circuit 36 has the phase relationships shown in FIG. 4E. The signals of FIGS. 4E and 4D are mutually subtracted by the subtractor 37, and since the crosstalk components of these two signals are identical in phase during each horizontal scanning interval, crosstalk cancellation is achieved. The resultant down-converted chrominance signal which is supplied to the output terminal 38 is as shown in FIG. 4F. The contents of each 1 H interval of that signal are the average of the respective chrominance signal contents of two mutually adjacent horizontal scanning lines of the playback Ch-1 signal, with crosstalk eliminated. Thus, the operation is based on an assumption that there will generally be a high degree of correlation between the chrominance information of any two successive horizontal scanning lines of the playback video signal.

Figure 4G:
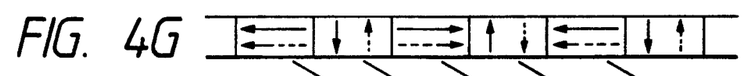
Figure 4H:
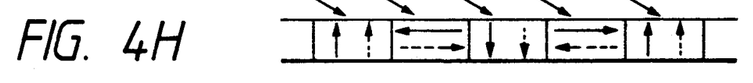
Figure 4I:
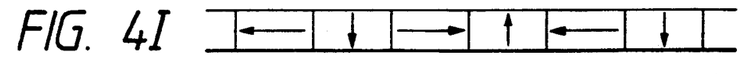

Similarly the Ch-2 playback signal, shown in FIG. 4G, contains crosstalk components resulting from adjacent Ch-1 tracks. This signal is phase shifted by −90° by the phase shifting circuit 33, and delayed by 1 H by the 1 H delay circuit 36 to obtain the signal shown in FIG. 4H. This is subtracted from the signal of FIG. 4G by the subtractor 37, to achieve crosstalk cancellation and produce the output signal shown in FIG. 4I, in which each horizontal scanning line is obtained as the average of two mutually adjacent horizontal scanning lines of the ch-2 playback down-converted chrominance signal.

Figure 5:
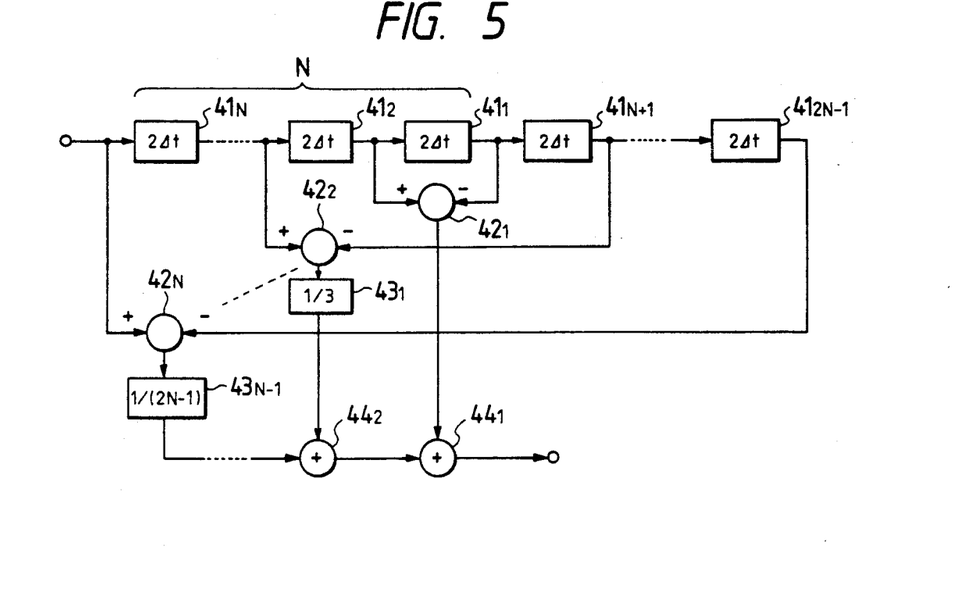
FIG. 5 is a block circuit diagram for describing the basic principles of a 90° phase shift circuit used in the embodiment of FIG. 3.

FIG. 5 is a block diagram to illustrate the basic configuration of a phase shift circuit which has been found suitable for implementing the phase shift circuit 32. By inverting the output signal obtained from this circuit, the function of the phase shift circuit phase shifting circuit 33 can also be implemented. In FIG. 5, $41_1$ to $41_{2n-1}$ are respective delay circuits, each of which provides a delay time of $2\Delta t$. $42_1$ to $42_n$ denote respective subtractor circuits, $43_1$ to $43_{n-1}$ denote respective constant multiplier circuits, and $44_1$, $44_2$, . . . denote signal adder circuits. The phase shift circuit of FIG. 5 is known as a Hilbert filter circuit, which provides a substantially fixed amount of phase shift of −90° over a wide frequency band which can extend down to substantially lower frequency values than is possible with other types of phase shift circuit. The amplitude/frequency response F of such a circuit is expressed as:

$$F = \sum_{k=1}^{n} \frac{1}{2k-1} \cdot \sin[(2k-1)\omega \Delta t] \quad (1)$$

In the above, k denotes a positive integer, $\omega$ denotes angular frequency, $\Delta t$ is a time which is equal to one half of the delay time that is produced by each of the delay circuits $41_1$ to $41_{2n-1}$. The value of $\Delta t$ is preferably selected such as to maximize the value that is obtained from equation (1) at the center frequency of the filter circuit, i.e. such as to make the term contained within the brackets [] become an odd multiple of $\pi/2$ at the center frequency.

If the value of N that is used in the circuit of FIG. 5 is made extremely large, then the frequency characteristic that is expressed by equation (1) will be substantially flat. However in a practical circuit it would be necessary to provide a large number of adjustment points if N is made large, and in addition there would be problems of signal quality deterioration.

Figure 6:
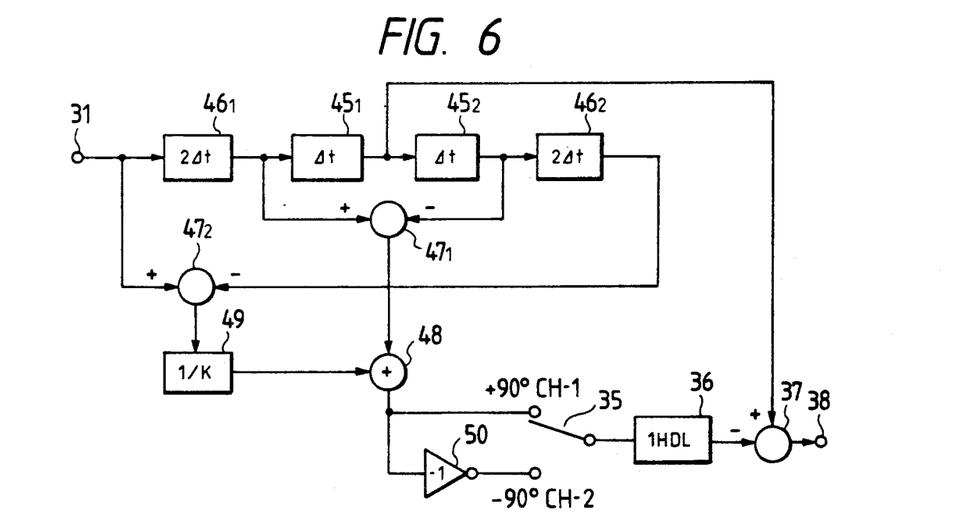
FIG. 6 is a block circuit diagram of a practical example of the embodiment of FIG. 3.

FIG. 6 shows a practical implementation of the embodiment of FIG. 3, utilizing a Hilbert filter circuit of the form shown in FIG. 5 for 90° phase shifting, with the value of N in FIG. 5 made equal to 2. The delay circuit 34 is implemented by the delay circuits $46_1$ and $45_1$ of the Hilbert filter circuit, since the output signal from delay circuit $45_1$, supplied to the subtractor circuit 37, corresponds to the output signal from the delay circuit 34 of FIG. 3. It is thereby unnecessary to provide a separate delay circuit 34. The value of K that is used for the integer constant multiplier 49 is established as 8, since such a value has been found to minimize ripple in the amplitude/frequency characteristic of the Hilbert filter circuit. If the center frequency of the Hilbert filter circuit is set to 629 kHz (i.e. as determined by the frequency band of the down-converted chrominance signal), then the value of $\Delta t$ is obtained as 397 nanoseconds, from equation (1) above, and the delay times of each of the delay circuits $45_1$, $45_2$, $46_1$, $46_2$ are thereby established.

The phase shift circuit that is thereby formed as the Hilbert filter circuit consisting of the delay circuits $45_1$, $45_2$, $46_1$, $46_2$, the subtractor circuits $47_1$ and $47_2$, the signal adder circuit 48 and the constant multiplier 49, has been found to provide an accurate phase shift of +90° over a substantially wide frequency band, such as to provide effective +90° phase shift of the down-converted chrominance signal. The output signal from the Hilbert filter circuit is also transferred through an inverter 50 to obtain an output signal which has been phase shifted by −90°. Thus, both of the phase shift circuits 32 and 33 of FIG. 3 are implemented.

Figure 7:
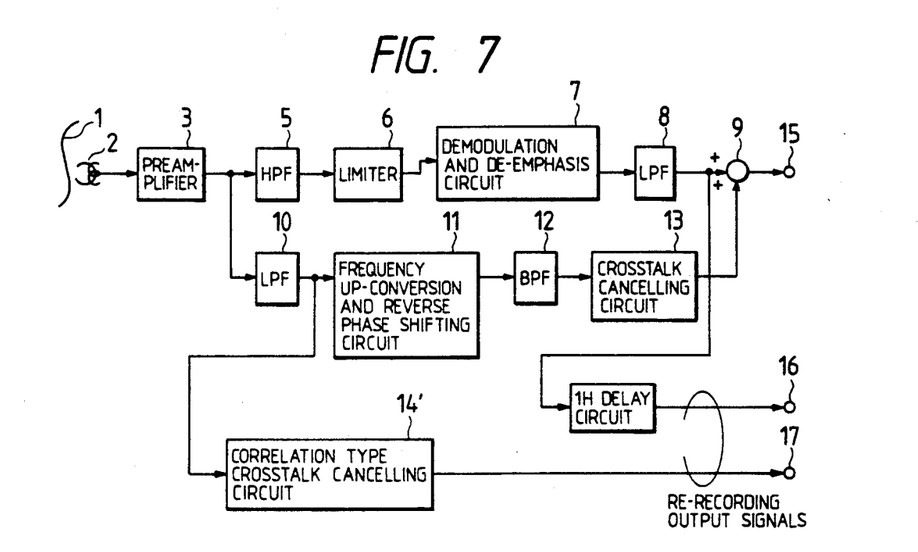
FIG. 7 is a system block diagram of a playback system of a VTR which incorporates a second or a third embodiment of a crosstalk cancelling circuit according to the present invention.

FIG. 7 is a system block diagram of a playback system of a VTR which incorporates a second embodiment or a third embodiment of a crosstalk cancelling circuit according to the present invention, designated by numeral 14'. This system is substantially identical to that of FIG. 2A, but includes a 1 H delay circuit 52 for delaying the playback luminance signal produced from LPF 8 by one horizontal scanning interval, and transferring the delayed signal to output terminal 16 as a re-recording output signal. This delay circuit 52 is made necessary to compensate for a 1 H delay that is applied to the playback down-converted chrominance signal by the crosstalk cancelling circuit 14', as described hereinafter.

Figure 8:
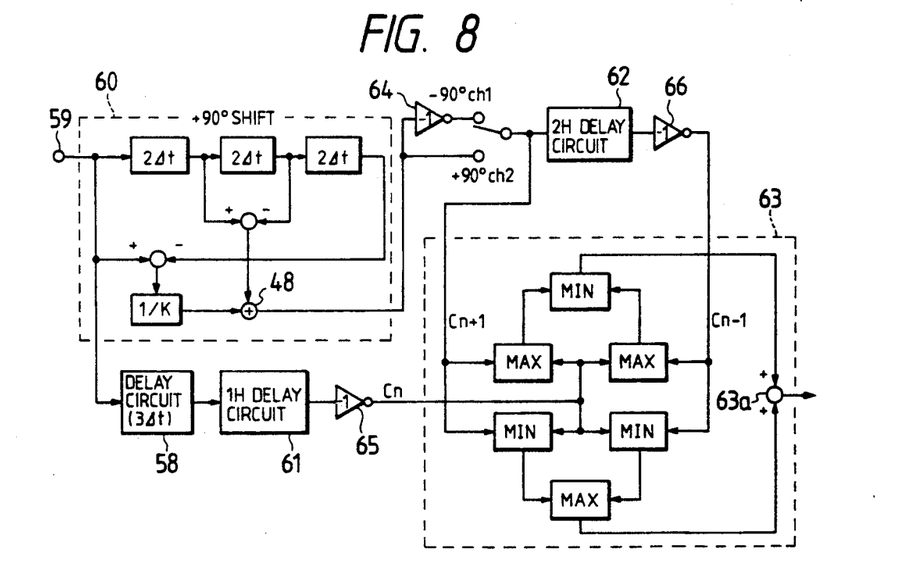
FIG. 8 is a block circuit diagram of the second embodiment.

FIG. 8 is a block circuit diagram of the second embodiment of a crosstalk cancelling circuit, which also employs a Hilbert filter circuit to execute 90° phase shifting as for the first embodiment. With the first embodiment as described above, the information in each horizontal scanning line of the output chrominance signal supplied to terminal 38 is the average of the information in two horizontal scanning lines of the input chrominance signal applied to terminal 31, i.e. the first horizontal scanning line of the output chrominance signal is the average of the first and second horizontal scanning lines of the input chrominance signal, the second horizontal scanning line of the output chrominance signal is the average of the second and third horizontal scanning lines of the input chrominance signal, and so on. However when such averaging is executed for two horizontal scanning lines of the input chrominance signal which do not have a high degree of vertical correlation, a reduction of resolution is produced in a display image that is obtained after re-recording and playback of the chrominance signal obtained from crosstalk cancelling circuit 14. With the second embodiment, this problem of reduced image resolution as a result of crosstalk cancelling circuit operation is substantially overcome, by arranging that each horizontal scanning line of the output chrominance signal obtained from the crosstalk cancelling circuit 14' is obtained as the average of two horizontal scanning lines of the input chrominance signal applied to that circuit, with these two horizontal scanning lines being selected from a set of three consecutive horizontal scanning lines of the input chrominance signal on the basis of optimum vertical correlation. To achieve this, the playback down-converted chrominance signal is divided into three signals, which will be respectively referred to as the chrominance signal $C_n$ of the current horizontal scanning line (obtained by passing the down-converted chrominance signal through a 1 H delay circuit 61 and an inverter 65 shown in FIG. 8, after transfer through a fixed delay of $3\Delta t$ for compensation of the Hilbert filter circuit delay time as described for the first embodiment), a chrominance signal $C_{n-1}$ of the preceding horizontal scanning line (obtained by 90° phase shifting of the playback down-converted chrominance signal), and a chrominance signal $C_{n+1}$ of the succeeding horizontal scanning line (obtained by passing the signal $C_{n+1}$ through a 2 H delay circuit 62). These signals are applied in parallel to an operational circuit 63, which combines the signals such as to obtain crosstalk cancellation with a minimum of deterioration of vertical resolution being produced as a result of the combining process.

The operation will be described referring to the conceptual phase diagrams of FIGS. 9A to 9J, which illustrate respective phase relationships in successive 1 H intervals assuming that the embodiment applies to an NTSC standard composite video signal. As in the case of FIG. 4D described above, FIG. 9A shows the phase conditions in a playback down-converted chrominance signal obtained from a Ch-1 track of the magnetic tape, with the phase of crosstalk that has been induced from adjacent Ch-2 tracks in each horizontal scanning interval being shown as respective broken-line arrows.

Figure 9A:
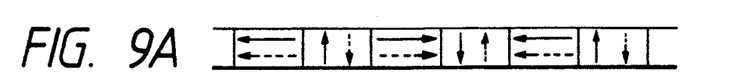
FIGS. 9A to 9J are conceptual diagrams for illustrating phase relationships during operation of the embodiment of FIG. 8.
Figure 9B:
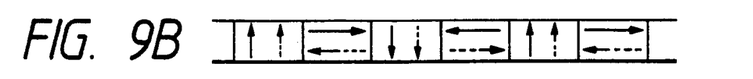
Figure 9C:
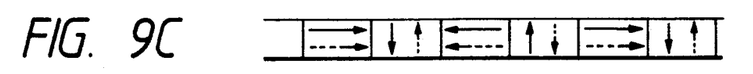
Figure 9D:
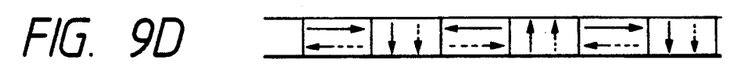
Figure 9E:
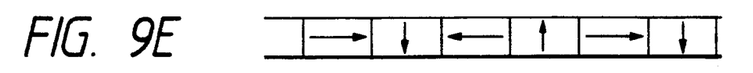
Figure 9F:
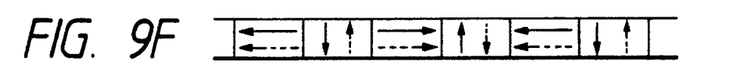
Figure 9G:
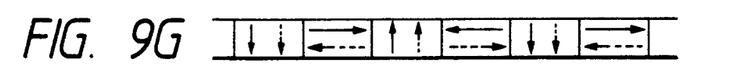
Figure 9H:
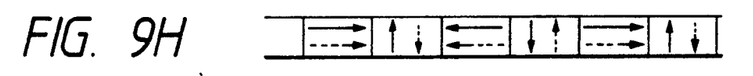
Figure 9I:
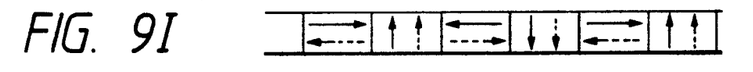
Figure 9J:
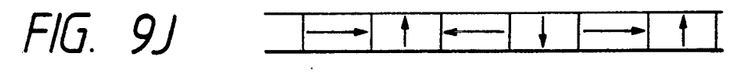

FIG. 9B similarly shows the phase conditions for the Ch-1 $C_{n+1}$ signal, obtained by transferring the Ch-1 playback chrominance signal of FIG. 9A through the +90° phase shift circuit 60. FIG. 9C shows the Ch-1 $C_n$ signal, obtained as the playback down-converted chrominance signal that has been delayed by 1 H and inverted. FIG. 9D shows the Ch-1 $C_{n-1}$ signal, which is obtained by delaying the $C_{n+1}$ signal by 2 H, then inverting the result. FIG. 9E shows an output down-converted chrominance signal that is obtained from the operational circuit 63, by combining signal $C_n$ with an appropriately selected one of the signals $C_{n+1}$ and $C_{n-1}$, with crosstalk components thereby being cancelled.

FIGS. 9F to 9J show corresponding phase conditions to those of FIGS. 9A to 9E, for the case of the playback signal being obtained from a Ch-2 track of the magnetic tape.

The basic function of the operational circuit 63 is to select (in each horizontal scanning interval) the one of the signals $C_{n-1}$ and $C_{n+1}$ that has the greater degree of vertical correlation with the $C_n$ signal, and to combine the selected signal with the $C_n$ signal to thereby achieve crosstalk cancellation with a minimum of reduction of vertical resolution. A very simple example of a configuration for the operational circuit 63 is shown in FIG. 8. Here, each of the blocks 63b designated as MAX has the function of comparing and selecting the one of the input signals supplied thereto which has the greater amplitude, and transferring that signal to the output thereof. Each of the blocks 63c designated as MIN has the function of comparing the input signals supplied thereto, selecting the one which has the smaller amplitude, and transferring that signal to the output thereof. A selected one of the signals $C_{n+1}$ and $C_{n-1}$ is thereby applied to one input of a signal adder 63a, and the signal $C_n$ applied to the other input, to produce an down-converted chrominance signal having crosstalk components cancelled as the output signal from the crosstalk cancelling circuit 14'.

The above simple configuration for the operational circuit 63 is shown only by way of example, and it would be possible to utilize a more complex arrangement which will more accurately perform the required functions of the circuit for various combinations of conditions of the signals $C_n$, $C_{n-1}$ and $C_{n+1}$. Specific circuits for executing such video signal vertical correlation comparison and selection functions are now well known in the art, so that no detailed description is given herein.

Since the signal $C_n$, corresponding to the current horizontal scanning line, is delayed by 1 H in this embodiment, it is necessary to apply a corresponding delay to the luminance signal that is supplied to output terminal 16 in FIG. 7, by the 1 H delay circuit 52.

Figure 10:
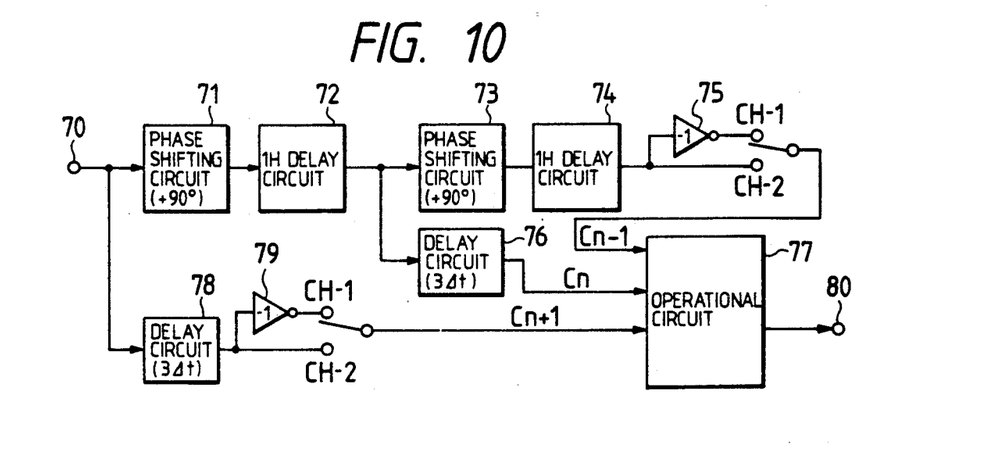
FIG. 10 is a block circuit diagram of the third embodiment.

FIG. 10 is a block diagram of a third embodiment of a crosstalk cancelling circuit according to the present invention, in which crosstalk cancelling is executed based on three successive horizontal scanning lines of the playback signal, as for the second embodiment. 71 and 73 denote respective +90° phase shift circuits, each being formed as a Hilbert filter circuit having the configuration of circuit 60 in FIG. 8. A set of three down-converted chrominance signals $C_n$, $C_{n-1}$ and $C_{n+1}$ are respectively derived from the playback down-converted chrominance signal, with these signals respectively corresponding to the signals $C_n$, $C_{n-1}$ and $C_{n+1}$ described above for the second embodiment. These signals are respectively supplied to an operational circuit 77 which is identical in function to the operational circuit 63 of the second embodiment described above, so that further description will be omitted. This embodiment differs from the second embodiment of FIG. 8 only in the way in which the signals $C_n$, $C_{n-1}$ and $C_{n+1}$ are generated.

Figure 11A:
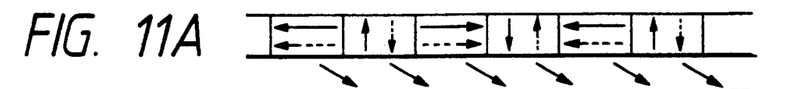
FIGS. 11A to 11I are conceptual diagrams for illustrating phase relationships during operation of the embodiment of FIG. 8.
Figure 11B:
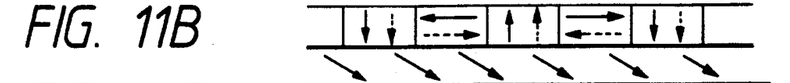
Figure 11C:
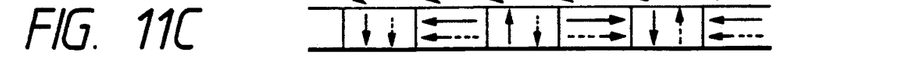
Figure 11D:
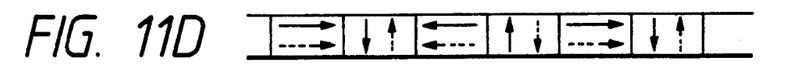
Figure 11E:
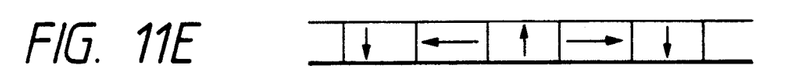
Figure 11F:
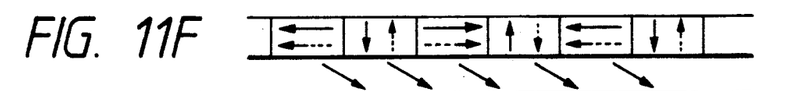
Figure 11G:
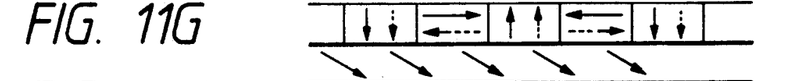
Figure 11H:
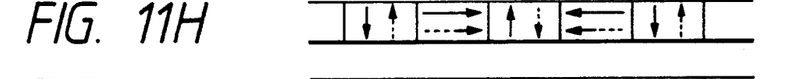
Figure 11I:
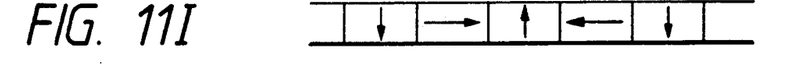

The operation will be described referring to the conceptual phase diagrams of FIGS. 11A to 11I, which illustrate respective phase relationships in successive 1 H intervals assuming that the embodiment is applicable to an NTSC standard composite video signal. FIG. 11A shows the phase conditions in successive 1 H intervals of a playback down-converted chrominance signal (supplied to input terminal 70) obtained from a Ch-1 track of the magnetic tape, with the phase of crosstalk that has been induced from adjacent Ch-2 tracks being shown as respective broken-line arrows. FIG. 11B similarly shows the phase conditions for the Ch-1 $C_n$ signal obtained from the signal of FIG. 11A by passing that signal through a $+90°$ phase shift circuit 71, a 1 H delay circuit 72, and a $3\Delta t$ delay circuit 76 (for compensation of phase shift circuit delay, as described hereinabove). Thus the Ch-1 $C_n$ signal consists of the playback down-converted chrominance signal, phase shifted by $+90°$ and delayed by 1 H. FIG. 11C shows the Ch-1 $C_{n-1}$ signal, obtained by transferring the playback chrominance signal (FIG. 9A) through the phase shift circuit 71, the 1 H delay circuit 72, a second phase shift circuit 73 (which also produces a $+90°$ phase shift), a second 1 H delay circuit 74, and an inverter 75. Thus, the Ch-1 $C_{n-1}$ signal is, in effect, obtained by delaying the playback down-converted chrominance signal (FIG. 9A) by 2 H. FIG. 11D shows the Ch-1 $C_{n+1}$ signal, which is obtained by transferring the playback down-converted chrominance signal through an inverter 79 (after transfer through a $3\Delta t$ compensation delay circuit 78), i.e. the $C_{n+1}$ signal is simply the playback down-converted chrominance signal after phase inversion.

FIGS. 11F to 11I show corresponding phase conditions to those of FIGS. 11A to 11E, for the case of the playback signal being obtained from a Ch-2 track of the magnetic tape. Since the Ch-2 $C_{n+1}$ signal is in effect identical to the Ch-2 playback down-converted chrominance signal shown in FIG. 11F, it is not shown.

The function of the operational circuit 77 of this embodiment is identical to that of the operational circuit 63 of FIG. 8, i.e. to select (for each 1 H interval, i.e. each horizontal scannng line) the one of the signals $C_{n+1}$ and $C_{n-1}$ that has the greater degree of correlation with the signal $C_n$ during that 1 H interval, and to combine the selected signal with the $C_n$ signal, with the resultant signal being supplied to an output terminal 80. A down-converted chrominance signal is thereby obtained having crosstalk components mutually cancelled, as for the preceding embodiments.

The operation of this embodiment has been described for the case of playback from a Ch-1 track of the magnetic tape. However operation during playback of a Ch-2 track is substantially identical. In that case the linked switches 81 and 82 are each changed over to select their respective Ch-2 contacts, so that the $C_{n+1}$ and $C_{n-1}$ signals are obtained without executing phase inversion by the inventors 75 and 79.

By utilizing a crosstalk cancelling circuit according to the second or third embodiments of the invention described above, shown in FIGS. 8 and 10 respectively, a substantial reduction of localized color blurring is obtained (by comparison with the first embodiment of FIG. 2), for a display image that is produced by playback of a video signal that has been re-recorded using the down-converted chrominance signal produced from the crosstalk cencelling circuit. In addition there is a substantially better degree of vertical resolution in the display image, so that an overall high quality of display image can be attained by utilizing the second or third embodiments.

Figure 12:
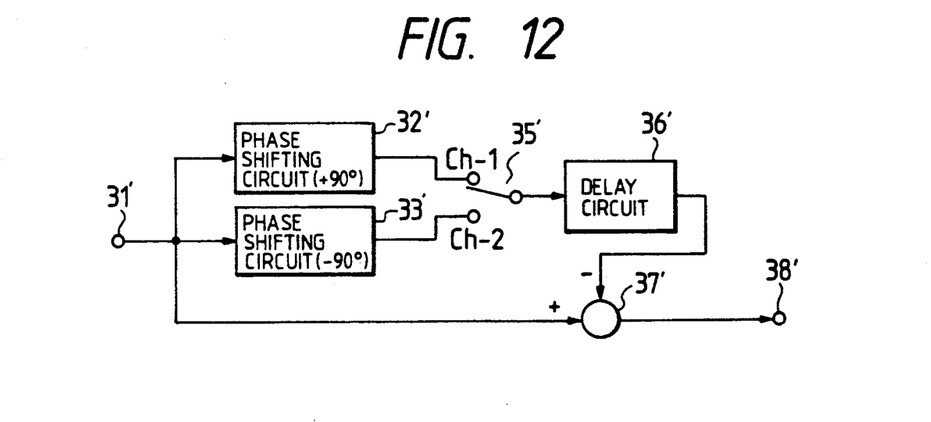
FIG. 12 is a modification of the circuit arrangement of FIG. 3 as shown.

Referring to FIG. 12, a modification of the circuit arrangement of FIG. 3 is shown. This modification differs from the circuit arrangement of FIG. 3 in that the delay circuit 34 has been omitted and the delay time of the delay circuit 36 is made shorter than 1 H. More specifically, the total delay time of the phase shifting circuit 32' or 33' and the delay circuit 36' is set to be equal to 1 H, and therefore, the delay circuit 34 of FIG. 3 is now unnecessary.

From the above it can be understood that by utilizing a crosstalk cancelling circuit according to the present invention in a VTR, for processing a playback down-converted chrominance signal which is to be re-recorded by another VTR, crosstalk components in the down-converted chrominance signal resulting from the effects of adjacent tracks on the magnetic tape are substantially eliminated. As a result, it has been found that a considerable improvement can be obtained in a display image that is obtained from playback of a magnetic tape on which an output down-converted chrominance signal from such a crosstalk cancelling circuit has been re-recorded, by comparison with prior art methods in which the playback down-converted chrominance signal is first up-converted in frequency and then down-converted in another VTR to be re-recorded thereby, or in which the playback down-converted chrominance signal is transferred directly to another VTR to be re-recorded (without frequency conversion), but without crosstalk cancellation being executed prior to that re-recording.

What is claimed is:

1. In a video tape recording apparatus having a playback system for playback of a down-converted chrominance signal and a frequency modulation luminance signal from recording tracks of a magnetic tape, said down-converted chrominance signal having been phase shifted prior to recording by successive 90° phase shifts in consecutive horizontal scanning intervals in a predetermined direction of phase shifting, said playback system including means for demodulating said frequency modulation luminance signal to obtain a luminance signal, said luminance signal and down-converted chrominance signal being supplied to first and second output terminals of said video tape recording apparatus respectively, the improvement comprising crosstalk cancelling circuit means for executing mutual cancellation of crosstalk components contained in said down-converted chrominance signal and for supplying a resultant down-converted chrominance signal to said second output terminal, wherein said crosstalk cancelling circuit means comprises:

phase shift circuit means for phase shifting said down-converted chrominance signal by 90° in a predetermined direction to produce an output signal;

delay circuit means for delaying said output signal from said phase shift circuit means by an amount equal to one horizontal scanning interval, to produce an output signal; and operational circuit means for combining said output signal from said delay circuit means with said down-converted chrominance signal to obtain an output down-converted chrominance signal having crosstalk components mutually cancelled, and for supplying said output down-converted chrominance signal to said second output terminal.

2. The improvement according to claim 1, in which said phase shift circuit means comprises a Hilbert filter circuit having a center frequency value which is determined in accordance with a frequency band occupied by said down-converted chrominance signal.

3. In a video tape recording apparatus having a playback system for playback of a down-converted chrominance signal and a frequency modulation luminance signal from recording tracks of a magnetic tape, said down-converted chrominance signal having been phase shifted prior to recording by successive 90° phase shifts in consecutive horizontal scanning intervals in a predetermined direction of phase shifting, said playback system including means for demodulating said frequency modulation luminance signal to obtain a luminance signal, said luminance signal and down-converted chrominance signal being supplied to first and second output terminals of said video tape recording apparatus respectively, the improvement comprising crosstalk cancelling circuit means for executing mutual cancellation of crosstalk components contained in said down-converted chrominance signal and for supplying a resultant down-converted chrominance signal to said second output terminal, wherein said crosstalk cancelling circuit means comprises:

phase shift circuit means for phase shifting said down-converted chrominance signal by 90° in a predetermined direction to obtain a phase shifted down-converted chrominance signal;

first delay circuit means for delaying said down-converted chrominance signal by an amount equal to one horizontal scanning interval, to obtain a first delayed down-converted chrominance signal;

second delay circuit means for delaying said phase shifted down-converted chrominance signal by an amount equal to two horizontal scanning intervals, to obtain a second delayed down-converted chrominance signal;

means operating during each horizontal scanning interval of said down-converted chrominance signal for determining which of said phase shifted down-converted chrominance signal and second delayed down-converted chrominance signal is most closely correlated with said first delayed down-converted chrominance signal; and operational means for combining said first delayed down-converted chrominance signal with said most closely correlated one of said phase shifted down-converted chrominance signal and second delayed down-converted chrominance signal, for thereby obtaining an output down-converted chrominance signal having crosstalk components mutually cancelled.

4. In a video tape recording apparatus having a playback system for playback of a down-converted chrominance signal and a frequency modulation luminance signal from recording tracks of a magnetic tape, said down-converted chrominance signal having been phase shifted prior to recording by successive 90° phase shifts in consecutive horizontal scanning intervals in a predetermined direction of phase shifting, said playback system including means for demodulating said frequency modulation luminance signal to obtain a luminance signal, said luminance signal and down-converted chrominance signal being supplied to first and second output terminals of said video tape recording apparatus respectively, the improvement comprising crosstalk cancelling circuit means for executing mutual cancellation of crosstalk components contained in said down-converted chrominance signal and for supplying a resultant down-converted chrominance signal to said second output terminal, wherein said crosstalk cancelling circuit means comprises:

first phase shift circuit means and first delay circuit means for applying a 90° phase shift in a predetermined direction and a delay which is equal to one horizontal scanning interval to said down-converted chrominance signal to obtain a first phase shifted and delayed down-converted chrominance signal;

second phase shift circuit means and second delay circuit means for applying a 90° phase shift in a predetermined direction and a delay which is equal to one horizontal scanning interval to said first phase shifted and delayed down-converted chrominance signal to obtain a second phase shifted and delayed down-converted chrominance signal;

means operating during each horizontal scanning interval of said down-converted chrominance signal for selecting one of said down-converted chrominance signal and said second phase shifted and delayed frequency down-shifted chrominance signal which is most closely correlated with said first phase shifted and delayed down-converted chrominance signal; and operational means for combining said first phase shifted and delayed down-converted chrominance signal with said most closely correlated one of said down-converted chrominance signal and second phase shifted and delayed down-converted chrominance signal, for thereby obtaining an output down-converted chrominance signal having crosstalk components mutually cancelled.

5. The improvement according to claim 3, in which each of said first and second phase shift circuit means comprises a Hilbert filter circuit having a center frequency value which is determined in accordance with a frequency band occupied by said down-converted chrominance signal.

6. In a video tape recording apparatus having a playback system for playback of a down-converted chrominance signal and a frequency modulation luminance signal from recording tracks of a magnetic tape, said down-converted chrominance signal having been phase shifted prior to recording by successive 90° phase shifts in consecutive horizontal scanning intervals in a predetermined direction of phase shifting, said playback system including means for demodulating said frequency modulation luminance signal to obtain a luminance signal, said luminance signal and down-converted chrominance signal being supplied to first and second output terminals of said video tape recording apparatus respectively, the improvement comprising crosstalk cancelling circuit means for executing mutual cancellation of crosstalk components contained in said down-converted chrominance signal and for supplying a resultant down-converted chrominance signal to said second output terminal, wherein said crosstalk cancelling circuit means comprises:

phase shift circuit means for phase shifting said down-converted chrominance signal by 90° in a predetermined direction to produce an output signal;

delay circuit means for delaying said output signal from said phase shift circuit means by an amount such that total delay time of said phase shift circuit means and said delay means is equal to one horizontal scanning interval, to produce an output signal; and operational circuit means for combining said output signal from said delay circuit means with said down-converted chrominance signal to obtain an output down-converted chrominance signal having crosstalk components mutually cancelled, and for supplying said output down-converted chrominance signal to said second output terminal.

7. The improvement according to claim 4, in which each of said first and second phase shift circuit means comprises a Hilbert filter circuit having a center frequency value which is determined in accordance with a frequency band occupied by said down-converted chrominance signal.

* * * * *